(No Model.)
R. WHITMAN & O. C. ABBOTT.
BICYCLE GEAR.
No. 599,209. Patented Feb. 15, 1898.
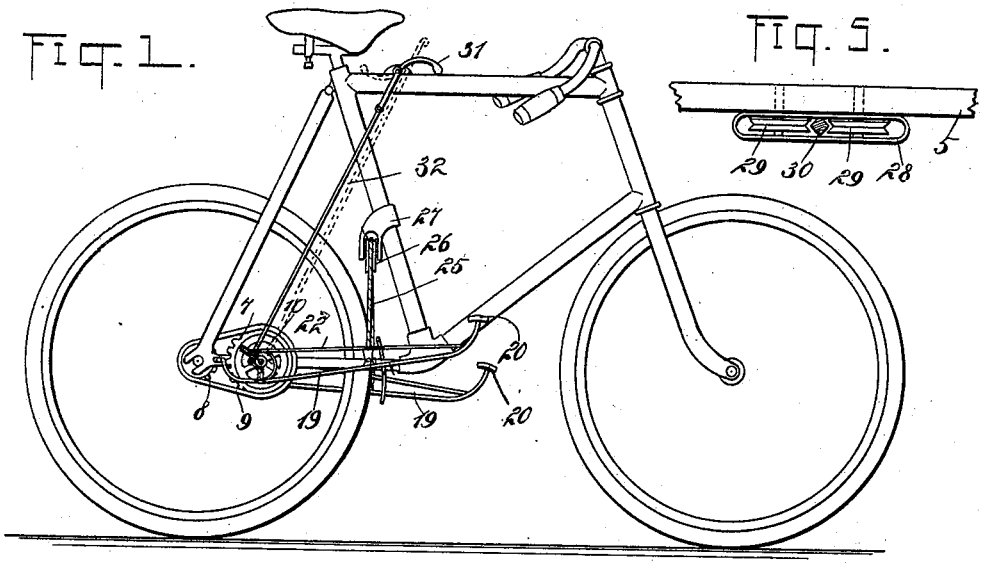
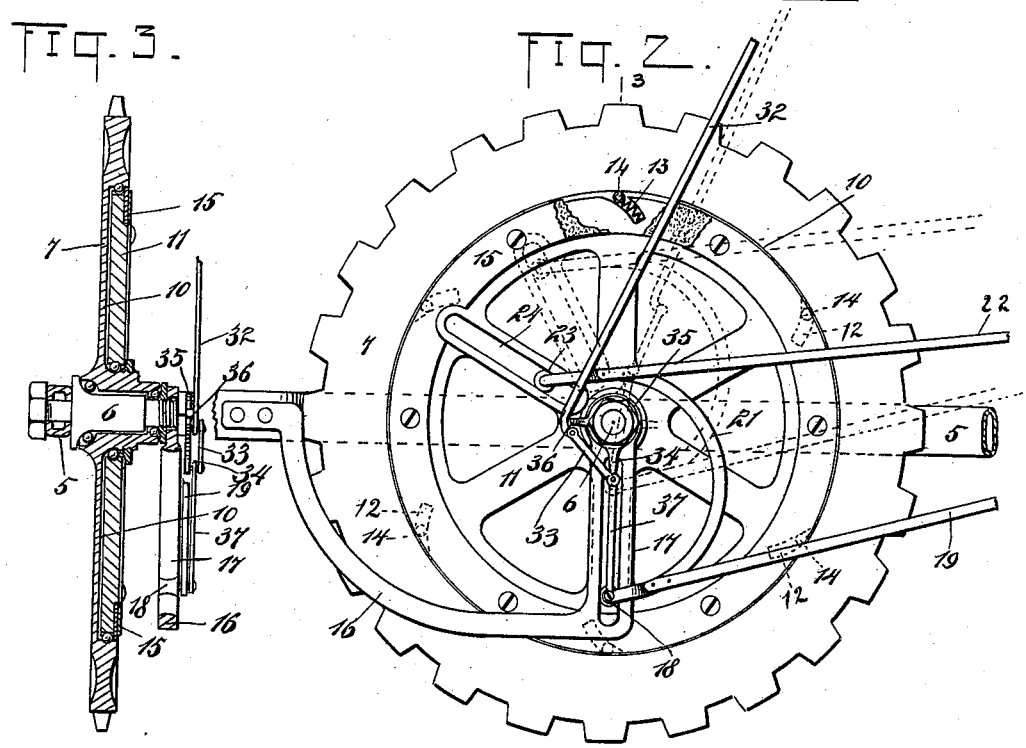
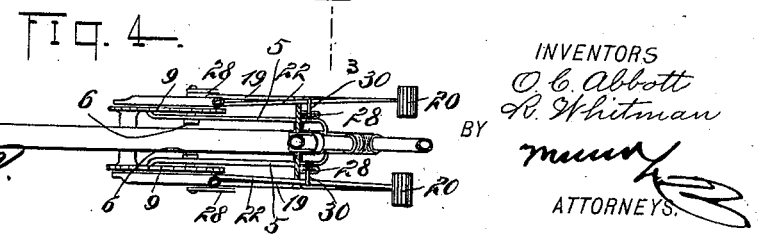
WITNESSES:
INVENTORS
O. C. Abbott
R. Whitman
BY
ATTORNEYS

UNITED STATES PATENT OFFICE.

RUDOLPH WHITMAN AND ORRIS C. ABBOTT, OF WALKERVILLE, MONTANA.

BICYCLE-GEAR.

SPECIFICATION forming part of Letters Patent No. 599,209, dated February 15, 1898.

Application filed July 20, 1897. Serial No. 645,226. (No model.)

*To all whom it may concern:*

Be it known that we, RUDOLPH WHITMAN and ORRIS C. ABBOTT, of Walkerville, in the county of Silver Bow and State of Montana, have invented a new and Improved Bicycle-Gear, of which the following is a full, clear, and exact description.

This invention is a bicycle-gear capable of adjustment to increase or diminish the leverage that may be exerted upon the wheel.

This specification is the disclosure of one form of our invention, while the claims define the actual scope of the conception.

Reference is to be had to the accompanying drawings, forming a part of this specification, in which similar characters of reference indicate corresponding parts in all the figures.

Figure 1 is a side elevation of the gear applied. Fig. 2 is an enlarged side elevation of the gear detached from the machine. Fig. 3 is a sectional view on the line 3 3 of Fig. 2. Fig. 4 is a fragmentary plan view of a bicycle having the invention applied, and Fig. 5 is a detail view of a guide device which is employed for the pedal-levers.

The invention is applicable to any foot-power gear and is shown applied to a safety-bicycle with a diamond frame. On the backstays 5 are carried stub-axles 6, on which the gear-wheels 7 are revolubly mounted. The gear-wheels 7 transmit movement to the pinions 8 of the drive-wheel of the machine, such transmission being through the medium of chain belts 9. (See Figs. 1 and 4.)

Revolubly mounted within an annular recess 10, formed in the outer face of the gear-wheels 7, are wheels 11, each having a series of tangentially-disposed peripheral slots 12, carrying springs 13, that press clutch-balls 14 against the outer walls of the recesses 10. As the wheels 11 revolve in one direction the balls 14 roll idly along said outer walls of the recesses 10; but as the wheels 11 turn in an opposite direction the balls 14 clutch against said outer walls, and the parts 7 and 11 are thus held in connection. The outer face of each wheel 11 is provided near its periphery with a ring 15, that is let into the face of the wheel, so as to assist in confining the balls 14 in place and to prevent the entry of dust. By means of the wheels 11 movement is transmitted to the gear-wheel 7, and thus the bicycle is propelled.

Attached to each backstay 5 are downwardly and forwardly curved arms 16, having upwardly-extending plates 17, respectively attached to the axles 6, as shown with reference to one of the axles in Fig. 3. Working in the slots of the plates 17 are the antifriction-rollers 18 of the rods 19, which rods run forwardly and have upward extensions carrying pedals 20. Attached to the inner end of each rod or lever 19 is a forwardly and rearwardly curved brace 21, said braces being rigidly attached to rods 22, running forwardly and attached to the free portions of the rods 19. The inner end of each rod 22 carries a roller 23, respectively running in radial slots 24, formed in the wheels 11. The two pairs of rods 19 and 22 form two pedal-levers which, upon being rocked, impart an oscillating movement to the wheels 11 and transmit in turn movement to the gear-wheels 7. Attached to each pedal-lever, or, in other words, to each pair of rods 19 and 22, is a flexible connection 25, which passes over a pulley 26, held by a frame 27, attached to the frame of a bicycle. This flexible connection 25 tends to raise and lower the pedal-levers in unison with each other.

Each backstay 5 carries a frame-plate 28, in which two oppositely-disposed wheels 29 are mounted. The wheels 29 are V-grooved in their peripheries and each pair holds between its members a vertically-movable guide-bar 30. The guide-bars 30 are respectively attached to the pedal-levers 22, so that said levers are prevented from swerving laterally as they swing vertically.

In order to adjust the disposition of the rollers 18 and 23 and thereby change the leverage of the apparatus, we provide for each pedal-lever a hand-lever 31, fulcrumed on the top brace of the bicycle-frame and pivoted to a rod 32, which extends downward and rearward and is connected by a knuckle-joint at its lower end to a link 33. The lower end of the link 33 is pivoted to an arm 34, rigid on a plate 35, that is mounted loosely on the corresponding stub-shaft 6. The plate 35 also has an arm 36 projecting at right angles to the arm 34. The arm 36 serves to engage the rod 32 when the corresponding pedal-lever is in its lowermost position in its plate 17, whereby when upward pressure is exerted on the rod 32 the rod will be caused to swing the link 33 rearward, so as to assume the position shown by dotted lines in Fig. 2. Pivoted to the arm 34 is a link 37, that extends downward and is pivoted to the corresponding rod 19. Consequently as a rod 32 is raised the rod 19, which is associated therewith, will be raised also. Since the rods 19 form rigid parts of the pedal-levers, these levers will be adjusted with the rods 19. By such means the position of the pedal-levers with reference to the plates 17 may be regulated and the speed of the bicycle controlled. The hand-levers 31 are arranged to remain in either of the two positions to which they may be swung.

Having thus described our invention, we claim as new and desire to secure by Letters Patent—

1. The combination of a gear, a wheel located adjacent to the gear, a clutch-ball between the wheel and gear, a slotted plate supported rigidly adjacent to the wheel and gear, and a pedal-lever having slidable connection with the slotted plate and having slidable connection with the wheel, the pedal-lever being adjustable on the slotted plate.

2. The combination of a revolubly-mounted gear having an annular recess running around the axis of the gear, a wheel revolubly mounted in said recess and having a radial slot, a clutch-ball interposed between the wheel and gear, a guide-plate held rigidly adjacent to the wheel and gear, and a pedal-lever having a part slidable on the guide-plate and having a part running in the slot of the wheel.

3. The combination with a bicycle-frame, of a stub-axle projecting outward therefrom, a gear-wheel revolubly mounted on the stub-axle and having an annular recess running around the axle, a wheel revolubly mounted within the annular recess, a clutch-ball interposed between the two wheels, a guide-plate rigidly held by the bicycle-frame and by the stub-axle, and a pedal-lever having parts respectively slidably connected with the second-named wheel and with the guide-plate.

4. The combination of a wheel having a slot therein, a plate supported rigidly adjacent to the wheel, a pedal-lever having two rigidly-connected portions one of said portions being in sliding connection with the plate and the other of said portions being slidable in the slot of the wheel, and means for holding the first of said portions of the pedal-lever adjustable to the plate.

RUDOLPH WHITMAN.
ORRIS C. ABBOTT.

Witnesses:
JOHN N. KIRK,
P. H. BURNS.